(12) United States Patent
Yoshida et al.

(10) Patent No.: US 11,130,101 B2
(45) Date of Patent: Sep. 28, 2021

(54) BUBBLE GENERATING DEVICE FOR SEWAGE PURIFICATION

(71) Applicant: AIENCE CO., LTD., Osaka (JP)

(72) Inventors: Norifumi Yoshida, Miki (JP); Kazuhiro Itoh, Himeji (JP)

(73) Assignee: AIENCE CO., LTD., Osaka (JP)

( * ) Notice: Subject to any disclaimer, the term of this patent is extended or adjusted under 35 U.S.C. 154(b) by 132 days.

(21) Appl. No.: 16/485,741

(22) PCT Filed: Feb. 14, 2018

(86) PCT No.: PCT/JP2018/005128
§ 371 (c)(1),
(2) Date: Aug. 13, 2019

(87) PCT Pub. No.: WO2018/151171
PCT Pub. Date: Aug. 23, 2018

(65) Prior Publication Data
US 2020/0001253 A1    Jan. 2, 2020

(30) Foreign Application Priority Data
Feb. 14, 2017    (JP) .............................. JP2017-024815

(51) Int. Cl.
*B01F 5/06*    (2006.01)
*B01F 3/04*    (2006.01)
(Continued)

(52) U.S. Cl.
CPC ................. *B01F 5/06* (2013.01); *B01F 3/04* (2013.01); *B01F 5/04* (2013.01); *C02F 1/34* (2013.01); *C02F 3/20* (2013.01)

(58) Field of Classification Search
CPC .. B01F 3/04; B01F 5/04; B01F 5/0415; B01F 5/0451; B01F 5/06; B01F 5/0606;
(Continued)

(56) References Cited

U.S. PATENT DOCUMENTS 3,968,086 A * 7/1976 Romanowski .... B01F 15/00525
261/77
3,969,446 A * 7/1976 Franklin, Jr. ........... C02F 3/205
261/87

(Continued)

FOREIGN PATENT DOCUMENTS

JP    H06-277691 A    10/1994
JP    2003-251384 A    9/2003
(Continued)

OTHER PUBLICATIONS

Supplementary European Search Report for corresponding Application No. 18754912.6 dated Sep. 14, 2020 (6 sheets).
(Continued)

*Primary Examiner* — Charles S Bushey
(74) *Attorney, Agent, or Firm* — Kratz, Quintos & Hanson, LLP

(57) ABSTRACT

A bubble generating device for sewage purification includes: an outer cylinder 6 vertically placed in water; an injection port 2A placed at a lower central portion in the outer cylinder 6 for upwardly injecting air as bubble flow supplied from an air supply source; and microbubble generating device 3 placed higher than the injection port 2A for refining bubbles injected from the injection port 2A. A throat portion 30 for narrowing a flow path of bubble flow and water flow which rises in the outer cylinder 6 is placed between the injection port 2A and the microbubble generating device 3.

7 Claims, 18 Drawing Sheets

(51) Int. Cl.
 *B01F 5/04* (2006.01)
 *C02F 1/34* (2006.01)
 *C02F 3/20* (2006.01)

(58) Field of Classification Search
 CPC ........ B01F 5/0655; B01F 5/0656; C02F 1/34; C02F 3/20
 USPC .......... 261/76, 77, 121.1, 123, 126, DIG. 75
 See application file for complete search history.

(56) References Cited

U.S. PATENT DOCUMENTS

| | | | | |
|---|---|---|---|---|
| 4,210,613 | A * | 7/1980 | Webb | C02F 3/1294 261/120 |
| 4,441,823 | A * | 4/1984 | Power | B01F 3/0807 138/42 |
| 4,690,764 | A * | 9/1987 | Okumura | B01F 3/0451 210/629 |
| 4,695,378 | A * | 9/1987 | Ackman | C02F 3/1294 210/198.1 |
| 4,764,283 | A * | 8/1988 | Ashbrook | C02F 1/34 210/221.2 |
| 4,780,217 | A | 10/1988 | Petersen | |
| 6,279,611 | B2 * | 8/2001 | Uematsu | B01F 5/0451 137/888 |
| 8,192,620 | B2 * | 6/2012 | Uematsu | B01F 5/061 210/192 |
| 9,221,022 | B2 * | 12/2015 | Glanville | B01F 5/0652 |
| 9,308,504 | B2 * | 4/2016 | Lai | B01F 3/04106 |
| 2006/0027100 | A1 * | 2/2006 | Kozyuk | B01F 5/0652 95/260 |
| 2013/0021868 | A1 * | 1/2013 | Doolin | B01F 3/0807 366/154.1 |

FOREIGN PATENT DOCUMENTS

| | | |
|---|---|---|
| JP | 2008-018330 A | 1/2008 |
| JP | 2011-121002 A | 6/2011 |
| JP | 2013-034953 A | 2/2013 |

OTHER PUBLICATIONS

International Search Report for International Application No. PCT/JP2018/005128, dated May 15, 2018.

\* cited by examiner

[Fig.1A]
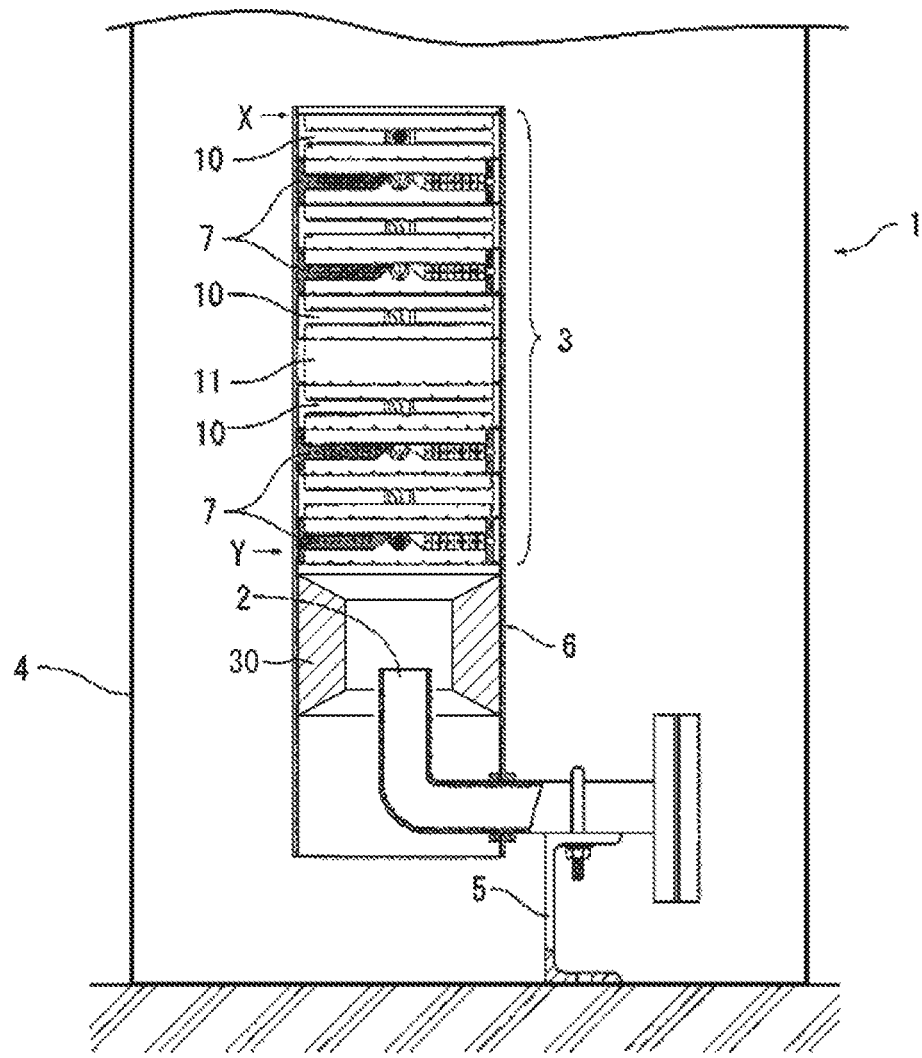

[Fig.1B]
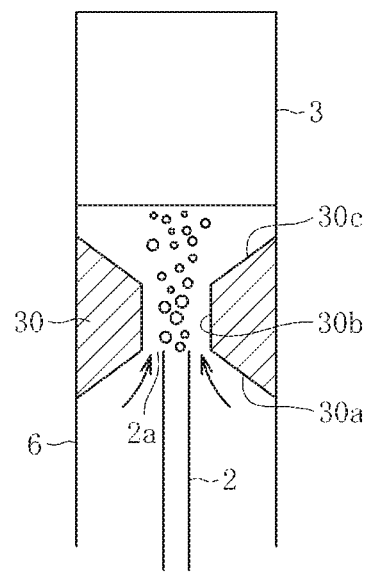

[Fig.2]
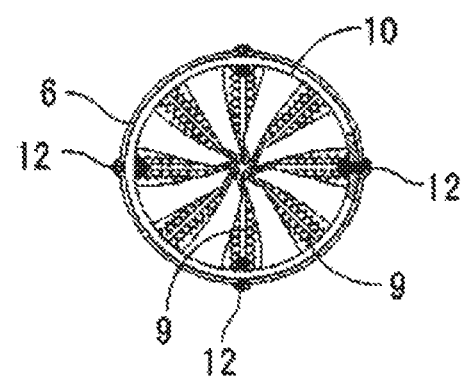

[Fig. 3]
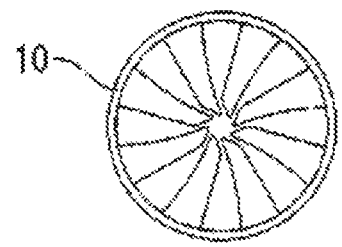

[Fig. 4]
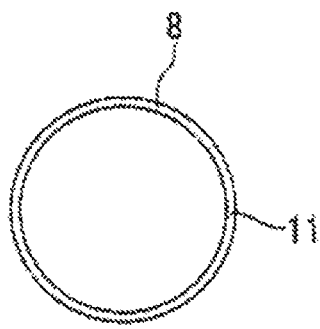

[Fig. 5]
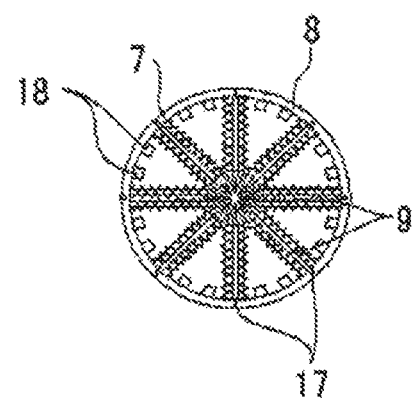

[Fig. 6]
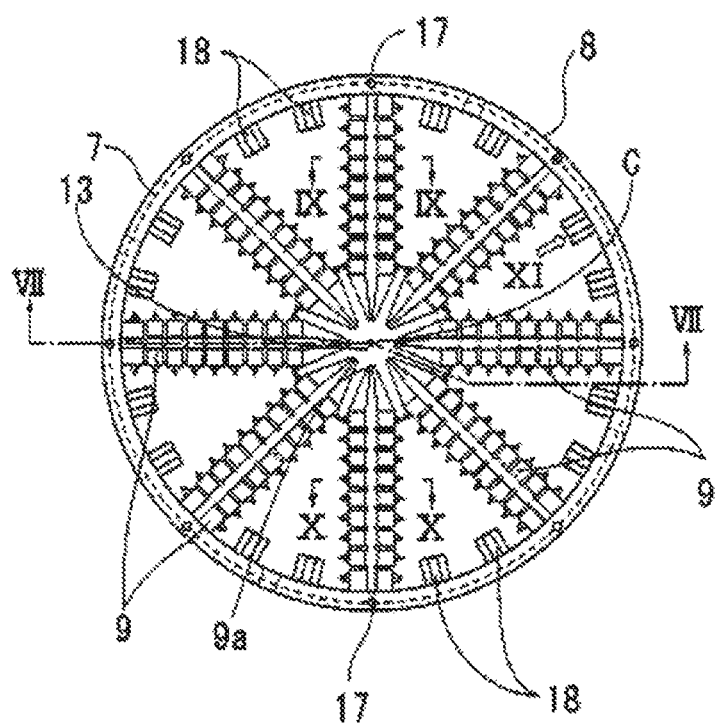

[Fig. 7]
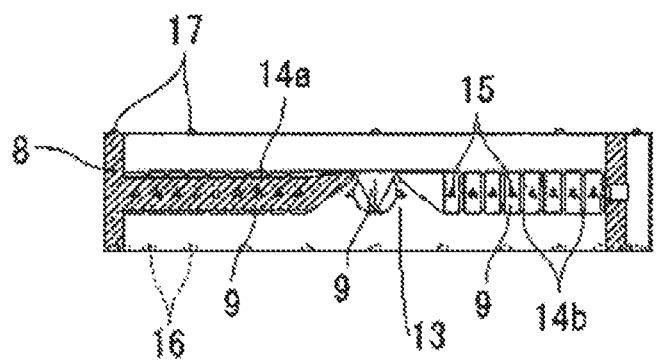

[Fig. 8]
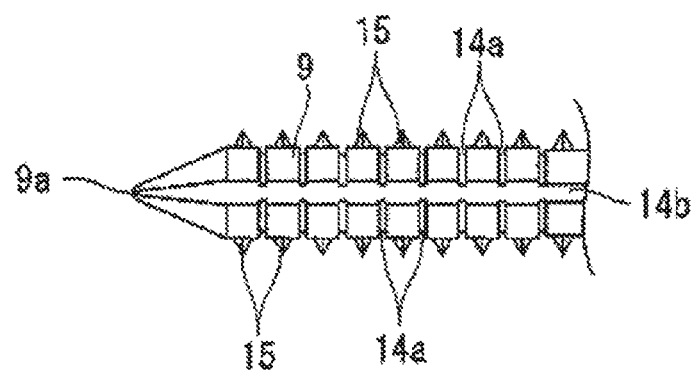

[Fig. 9]
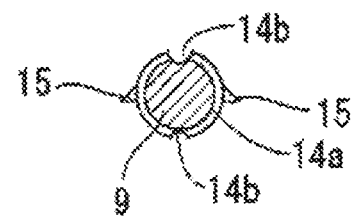

[Fig. 10]
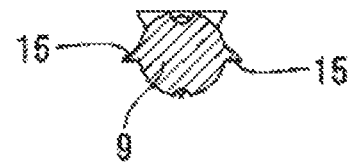

[Fig. 11]

[Fig. 12]
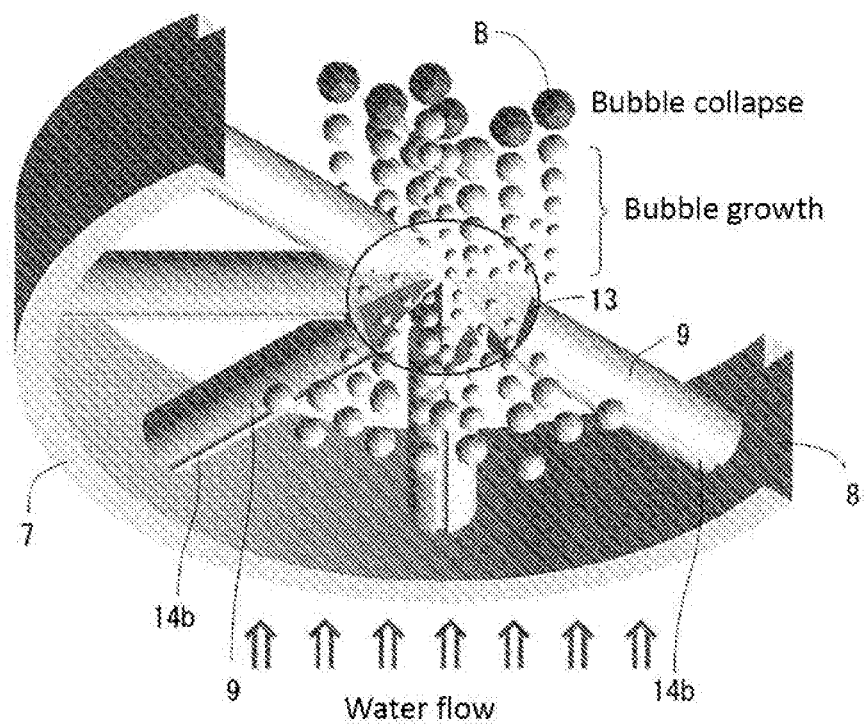

[Fig.13]
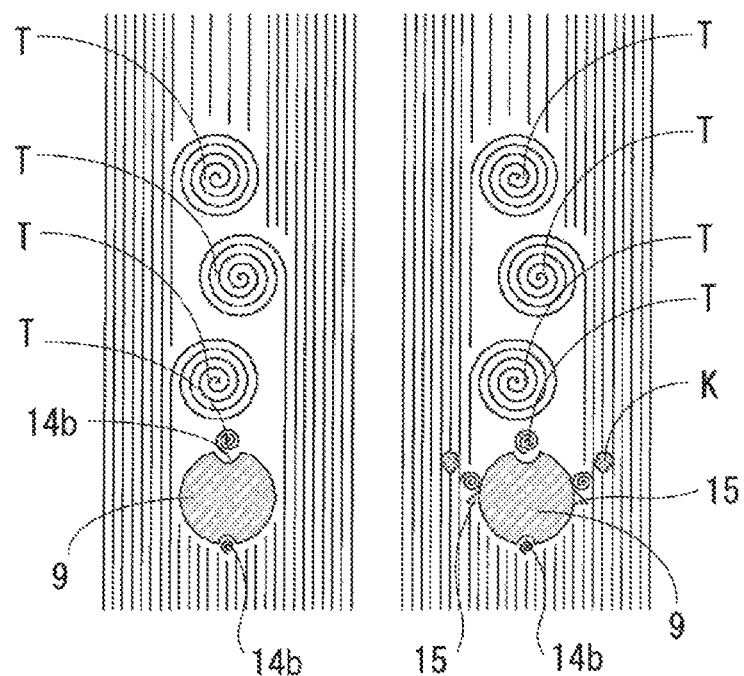

[Fig. 14]
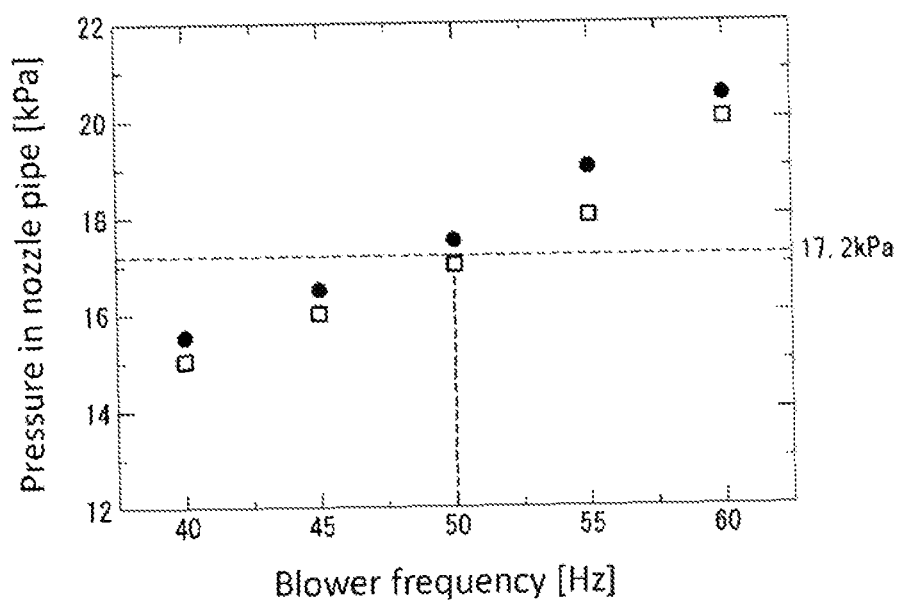

[Fig. 15A]
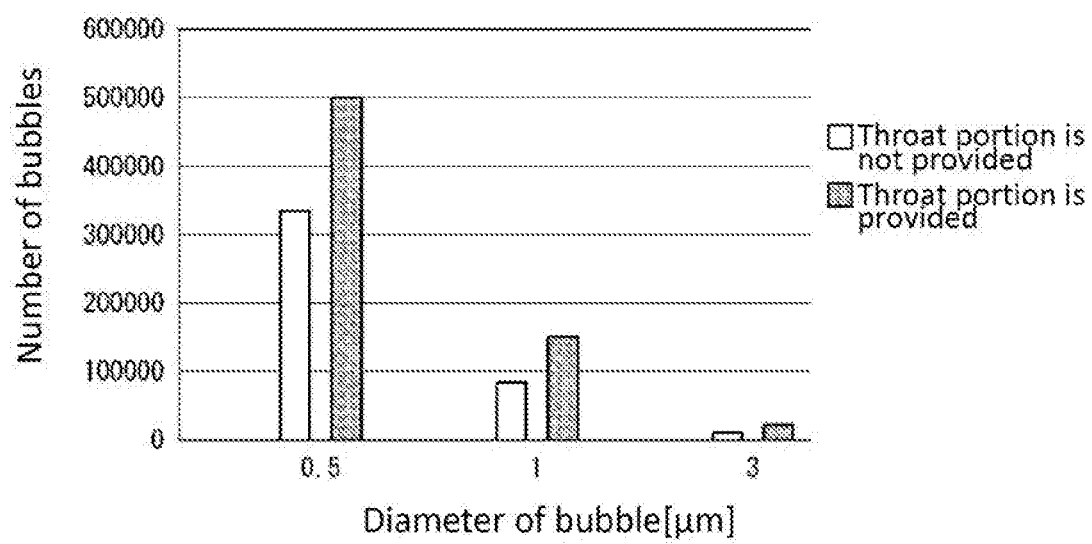

[Fig. 15B]
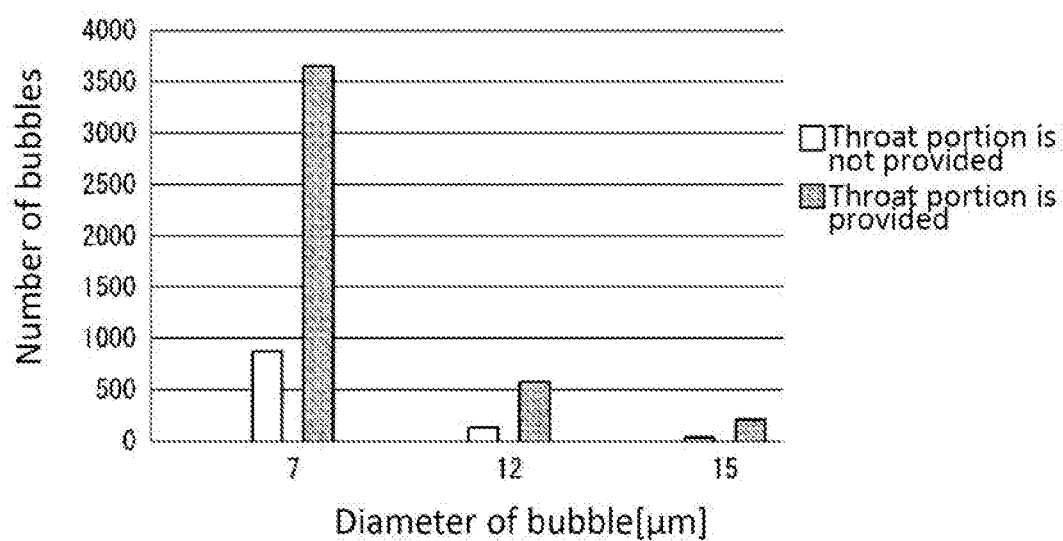

[Fig. 16]
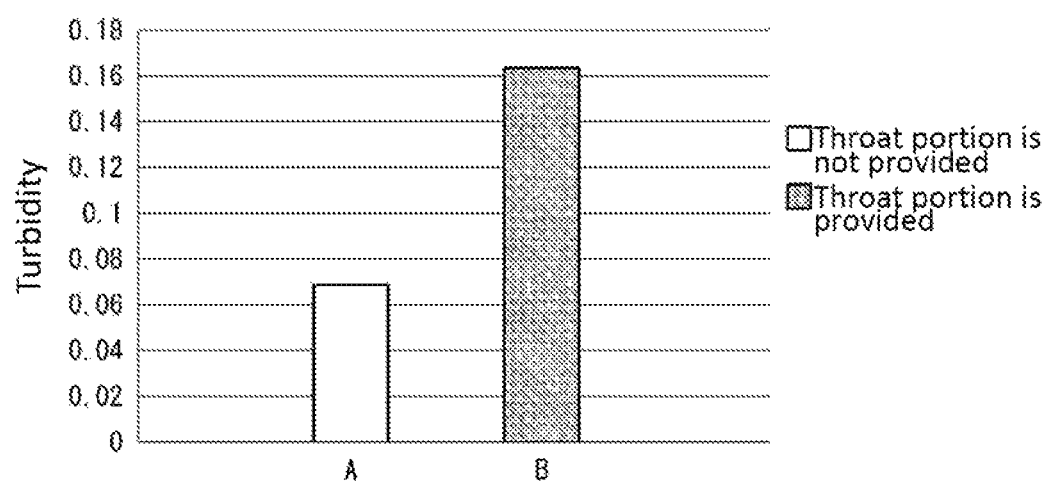

BUBBLE GENERATING DEVICE FOR SEWAGE PURIFICATION

TECHNICAL FIELD

The present invention relates to a bubble generating device for sewage purification used in a device and the like which purify, utilizing aerobic bacteria, sludge water and water contaminated by mineral oil or vegetable oil when the water is discharged.

BACKGROUND TECHNIQUE

In a factory or the like using water, to purify water contaminated by mineral oil or vegetable oil, there is generally used a method to bacterize the contaminated water with aerobic bacteria, and breed the aerobic, bacteria and the like, thereby making the contaminated component to be digested and processed. In such a purification device of sewage, to breed the aerobic bacteria and the like, it is necessary that microbubbles are mixed with the sewage to facilitate oxygen breathing and living environment of the aerobic bacteria and the like is appropriately arranged.

The conventional device for mixing microbubbles into sewage and generating the microbubbies is placed in the sewage or the like which is to be purified, air is discharged from an air-discharging port provided in a lower end of a pipe of a cylinder or the like and rising flow of bubbles is generated. Upward water flow generated by the bubble flow is made as spiral water flow by a spiral blade or the like, bubbles are mixed in the rising water flow, the bubbles are refined at the same time by bubble refining means which is placed in the pipe and which has a large number of projections, and purification of the sewage is facilitated.

PRIOR ART DOCUMENT

Patent Document

Patent Document 1: Japanese Patent No. 3677516

SUMMARY OF THE INVENTION

Problem to be Solved by the Invention

In the above-described conventional bubble mixing device and the like, it was considered for many years that stirring of water flow was facilitated by forming spiral water flow, mixing of bubbles into sewage was facilitated, and generation and mixing of bubbles into sewage were efficiently carried out. In the purification of sewage and the like, there is a general method in which air (bubbles) is made to collide against a projection in water flow, thereby refining the bubbles. However, to purify the sewage more effectively, it was found that cavitation and the like were generated in the sewage and the like, this was bubble-collapsed by variation in water pressure and according to this, purification of sewage and the like can be carried out more effectively and efficiently. To generate the cavitation and the like in the sewage and the like, it is necessary to expedite the water flow and vary pressure in the water flow instead of utilizing the spiral water flow or dispersing water flow flowing in a cylinder. Based on this viewpoint, in the spiral water flow in the conventional bubble mixing device and the like, the water flow becomes slow on the contrary, and this disturbs generation of bubbles in sewage and the like.

The present invention has been accomplished in view of the above problem, and it is an object of the invention to provide a bubble generating device capable of efficiently injecting bubbles to sewage with inexpensive operation cost.

Means for Solving the Problem

To solve such a problem, the present invention provides a bubble generating device for sewage purification including: an outer cylinder vertically placed in water; an injection port placed at a lower central portion in the outer cylinder for upwardly injecting air as bubble flow supplied from an air supply source; and microbubble generating means placed in the outer cylinder located higher than the injection port for refining bubbles injected from the injection port, wherein a throat portion for narrowing a flow path of bubble flow and water flow which rises in the outer cylinder is placed between the injection port and the microbubble generating means.

Effect of the Invention

According to the present invention since the throat portion is placed between the injection port of the bubble flow and the microbubble generating means, bubble flow injected from the injection port flows into the throat portion by buoyancy force and inertia force and by this flowing energy, surrounding water around the injection port is sucked into the throat portion, this water flow and the bubble flow become mixed flow in the throat portion and its flow path is narrowed, thereby accelerating the mixed rising flow of the water flow and bubble flow. This accelerated bubble group collides against the upper microbubble generating means at high speed, the bubble group finely bursts by this collision, and the finely bursted bubbles further burst by the pressure reduction caused by acceleration and become microbubbles. As a result, strong cavitation is efficiently generated, cell membranes of bacterium and microorganism are crushed by mechanical impact force caused by generation and extinction of the steam bubbles of the cavitation, and they die out and are disinfected, thereby making it possible to efficiently purify the sewage and the like. Since the water flow accelerates toward the inlet of the throat portion, pressure around the outlet of the injection port is lowered, and this can reduce the power consumption of the blower which supplies air to the injection port.

BRIEF DESCRIPTION OF THE DRAWINGS

FIG. 1A is a side sectional view of a bubble generating device of an embodiment of the present invention;

FIG. 1B is a sectional view of a throat portion of the bubble generating device of the embodiment of the invention;

FIG. 2 is a plan view of the device from which a portion thereof is cut away;

FIG. 3 is a plan view of the device from which another portion is cut away;

FIG. 4 is a plan view of the device from which further another portion is cut away;

FIG. 5 is a plan view of the device from which further another portion is cut away;

FIG. 6 is a plan view of a cylindrical body of the device;

FIG. 7 is a side sectional view of the cylindrical body of the device;

FIG. 8 is an enlarged side view of a projection of the cylindrical body of the device;

FIG. 9 is a sectional view of the projection of the cylindrical body of the device;

FIG. 10 is a sectional view of the projection of the cylindrical body of the device;

FIG. 11 is a front view of an inner wall projection of the device;

FIG. 12 is a schematic explanatory diagram showing a relation between water flow such as sewage and the cylindrical body in the embodiment of the invention;

FIG. 13 is an explanatory diagram showing a relation between the water flow such as sewage and the cylindrical body in the embodiment of the invention;

FIG. 14 is a correlation diagram between inverter control frequency of a blower and pressure in a nozzle pipe;

FIG. 15A is a correlation diagram between a diameter of bubble and the number of bubbles;

FIG. 15B is a correlation diagram between a diameter of bubble and the number of bubbles; and FIG. 16 is a comparison diagram of turbidity between presence or absence of the throat portion.

MODE FOR CARRYING OUT THE INVENTION

A bubble generating device of an embodiment of the present invention will be described below with reference to the drawings. FIG. 1A is a side sectional view of the bubble generating device of the embodiment of the invention, and FIG. 1B is a sectional view of a throat portion of the bubble generating device. FIGS. 2 to 5 are plan views from which portions of the device are cut away.

A lower end of the bubble generating device 1 is provided with an injection port 2a of a nozzle 2 connected to a known air supply source (not shown) such as a wind-blasting blower. Microbubble generating means 3 which refines air injected from the injection port 2a is placed at a position higher than the injection port 2a. The bubble generating device 1 is fixed through a fixing tool 5 or the like in a purification tank 4 which holds and purifies liquid such as sewage. The bubble generating device 1 is used in liquid such as sewage. The microbubble generating means 3 is placed a cylindrical outer cylinder 6 such that a plurality of cylindrical bodies 7 are stacked on one another in an axial direction of the outer cylinder 6.

As shown in FIGS. 1A and 1B, a throat portion 30 is placed between the nozzle 2 and the microbubble generating means 3. The throat portion 30 is placed by fixing a cylindrical member made of resin or the like to an inner peripheral surface of the outer cylinder 6 through a screw or the like. The throat portion 30 includes a lower end inlet opening 30a formed as a conical tapered surface and an upper end outlet opening 30c. A portion between the inlet opening 30a and the outlet opening 30c is formed as a narrowed portion 30b having a narrowed inner diameter and having a circular cross section. The injection port 2a of the nozzle 2 is placed such that the injection port 2a opens vertically upward coaxially with a center axis of the narrowed portion 30b in the vicinity of a boundary between the inlet opening 30a and the narrowed portion 30b.

Each of the cylindrical bodies 7 is composed of a cylindrical main body 8 and a plurality of projections 9 projecting from the main body 8 toward a center of the cylindrical body 7. In FIG. 1A, in addition to a configuration that the plurality of cylindrical bodies 7 are stacked on one another in positions (higher than injection port 2a) where air injected from the injection port 2a rises, cylindrical bodies 10 having a shape shown in FIG. 2 are stacked and placed.

The microbubble generating means 3 further includes a spacer 11 for placing the cylindrical bodies 7 and 10 at predetermined intervals. The spacer 11 is composed of only the main body 8 without the projections 9. This spacer 11 is used when a distance between the stacked cylindrical bodies 10 is maintained, when a clog caused if the number of the cylindrical bodies 10 is too much is prevented, or when a predetermined entire height is maintained by reducing the number of stacked cylindrical bodies 10.

The cylindrical outer cylinder 6 and the plurality of cylindrical bodies 1 and 10 stacked in the axial direction of the outer cylinder 6 while appropriately sandwiching the spacer 11 are fixed to each other through four rivets 12 at upper and lower two locations (X, Y). It is preferable to employ such a configuration that pressure of air injected from the injection port 2a is adjusted such that speed of sewage (liquid) passing through the microbubble generating means 3 becomes 5 m or more per second. Adjacent cylindrical bodies 7 are placed such that they are displaced from each other 22.5° in a rotation direction so that the projections 9 are not superposed on each other as viewed in an axial direction of the cylindrical bodies 7 and 10.

Next, detailed structure of the cylindrical bodies 7 will be described with reference to FIGS. 6 to 11. Each of the cylindrical bodies 7 is composed of the cylindrical main body 8 and the plurality of projections 9 projecting from the main body 8 toward the center of the cylindrical body 7. At a central portion C on which tip ends 9a of the projections 9 converge, the tip ends 9a are formed into acute angles, and lengths of the respective projections 9 are set to predetermined values so that an opening 13 for generating cavitation is formed in the central portion C by the tip ends 9a of the plurality of projections 9.

Since the tip ends 9a of the projections 9 are formed into the acute angles at the central portion C on which the tip ends 9a converge, the opening 13 is formed into a substantially conical shape (accurately, polygonal conical shape in this embodiment, see especially FIG. 7) in which a diameter of the opening 13 becomes smaller upward in the axial direction of the cylindrical body 7. Radial notches 14a, axial notches 14b and projections 15 are formed in and on outer peripheries of the projections 9.

Positioning holes 16 for fixing positions of the main bodies 8 when using and fixing projections 17 are formed in and on two axially opposed surfaces of the main body 8 of each of the cylindrical bodies 7. Inner wall projections 18 are formed in an inner wall of the main body 8. The inner wall projections 18 includes the notches 14b for further facilitating generation of bubbles.

Next, generating action of bubbles in the microbubble generating means 3 of the embodiment will be described. If bubbles are injected from the injection port 2a of the nozzle 2 upward into water as shown in FIG. 1B, bubbles rise toward the narrowed portion 30b of the throat portion 30 by buoyancy force of the bubbles. By the inflow action of the bubble flow into the narrowed portion 30b, water existing outside of the nozzle 2 is sucked into the narrowed portion 30b of the throat portion 30. Therefore, the bubble flow accelerates the rising water flow energy (flow speed), and fluid in which water flow and bubble flow are mixed rises and flows into the above microbubble generating means 3 located at a higher position.

FIGS. 12 and 13 show a relation between the cylindrical bodies 7 and water flow (heading upward in the drawings) such as sewage including bubbles. Water flow heading upward in FIGS. 12 and 13 flows upward in a cylindrical water path formed by the cylindrical bodies 7, but the water flow tries to converge on the opening 13 of the central portion C in the cylindrical water path.

The fluid converging on the center is attracted by the polygonal conical opening 13, and passing flow speed becomes fast when the fluid passes through the opening 13. If the flow speed becomes fast, pressure in that portion is lowered (by Bernoulli's theorem). A portion of air in the fluid having the lowered pressure bursts as the pressure is lowered, and becomes fine microbubbles. That is, cavitation is generated.

In this case, the smaller a diameter of the opening 13 is, the faster the flow speed of liquid passing through the opening 13 becomes, and cavitation is generated more effectively and generation of bubbles is facilitated. On the other hand, since dirt and mud are mixed in sewage or the like, if the diameter or a passing width is small, clog is generated. Hence, it is necessary that the diameter of the opening 13 is about 2 mm at minimum. Further, it is necessary that speed in local of passing fluid is 5 m or more per second.

Thereafter, water flow which passed through the opening 13 is released at once, collapse of bubbles, i.e., a large number of bubbles B are generated and the bubbles are refined. Fluid which escaped from the central portion C to its periphery collides against the projections 9. FIG. 13 shows a relation between the projections 9 and fluid which passes through the projections 9.

Spiral cavitation T is generated by the radial notches 14a and the axial notches 14b of the outer peripheries of the projections 9, small turbulent flow occurs by the projections 15, and the spiral cavitation T and cloud K are generated. As described above, generation of microbubbles B is facilitated by providing the radial notches 14a and the axial notches 14b as shown in FIG. 12.

FIG. 14 is a correlation diagram between inverter control frequency of a blower which supplies pressurized air to the nozzle 2, and pressure in a pipe which connects the blower and the nozzle 2 to each other. The injection port 2a of the nozzle 2 was placed at a water depth of 1.75 m (water pressure of 17.2 kPa), and frequency of the blower was varied in five stages from 40 Hz to 60 Hz at intervals of 5 Hz. In the drawing, • shows pressure in the pipe when the throat portion 30 is not provided, and shows pressure in the pipe when the throat portion 30 is provided.

As apparent from the drawing, as the blower frequency is increased, pressure in the pipe is also increased, but if the throat portion 30 is provided, pressure in the pipe is lowered as compared with a case where the throat portion 30 is not provided. For example, when blower frequency is 50 Hz, pressure in the pipe becomes lower than water pressure (17.2 kPa). This is because if since water is attracted by the narrowed portion 30b, water flow accelerates as described above and as a result, outlet pressure of the injection port 2a of the nozzle 2 is lowered. The drawing shows that apparent pressure loss of the device is zero or lower than zero. Hence, power consumption of the blower can be reduced by this pressure reduction.

A pressure difference between the case where the throat portion 30 is provided and the case where the throat portion 30 is not provided is varied depending upon a ratio Fn/Ft between an opening area Fn of the injection port 2a and an opening area Ft of the narrowed portion 30b of the throat portion 30. To reduce the pressure by providing the throat portion 30, it is advantageous to adjust the ratio Fn/Ft in a range of 0.1 to 0.4 or 0.1 to 0.5 (preferably about 0.3). If the ratio Fn/Ft is about 0.3, the largest pressure reduction can be realized, the power consumption of the blower can be minimized and the operation cost can be reduced.

FIGS. 15A and 15B are graphs in which diameters of bubbles generated and the number of the bubbles by the microbubble generating means 3 are compared between presence and absence of the throat portion 30. As apparent from these drawings, it is found that if the throat portion 30 is provided, the number of generated bubbles is reliably increased. Especially, in the case of bubbles having diameters of 7 μm, the number of generated bubbles can be increased to three times or more.

If the number of generated bubbles increased, turbidity in the purification tank 4 is also increased. FIG. 16 is a comparison diagram of turbidity between presence and absence of the throat portion 30. It can be found that if the throat portion 30 is provided, the turbidity is increased to two time or more. As described above, mechanical impact force is generated by generation and extinction of steam bubbles caused by generation of the large number of bubbles and strong cavitation. According to this, cell membranes of bacterium and microorganism are crushed, and the bacterium and the microorganism die out and they are disinfected.

Although the embodiment of the invention has been described above, the invention is not limited to the embodiment and can variously be modified. For example, it is unnecessary that the length of the narrowed portion 30b is relatively short as shown in the drawings, and the length of the throat portion 30 can variously be changed in accordance with necessity. It is only necessary that the injection port 2a of the nozzle 2 is placed in the vicinity of the lower end inlet opening 30a of the throat portion 30, and it is not absolutely necessary to place the in port 2a in the vicinity of the boundary between the inlet opening 30a and the narrowed portion 30b as shown in the drawings. It is not absolutely necessary that the ratio Fn/Ft between the opening area Fn of the injection port 2a and the opening area Ft of the narrowed portion 30b of the throat portion 30 is about 0.3, and the ratio can appropriately be changed within the range of 0.1 to 0.4 or 0.1 to 0.5. The throat portion 30 is configured by fixing the cylindrical member made of resin or the like in the outer cylinder 6. In addition to this configuration, it is also possible to form the throat portion 30 in other methods. For example, the outer cylinder 6 itself may be subjected to the drawing processing without using the cylindrical member, the outer cylinder 6 itself may be casted into a shape having a narrowed portion, or the outer cylinder 6 may be produced by joining a thick pipe and a thin pipe through a tapered surface or a smooth different diameter joint.

The invention claimed is:

1. A bubble generating device for sewage purification comprising: an outer cylinder vertically placed in water; an injection port placed at a lower central portion in the outer cylinder for upwardly injecting air as bubble flow supplied from an air supply source; and microbubble generating device placed in the outer cylinder located higher than the injection port for refining bubbles injected from the injection port, wherein a throat portion for narrowing a flow path of bubble flow and water flow which rises in the outer cylinder is placed between the injection port and the microbubble generating device, wherein the microbubble generating device has such a configuration that each of a plurality of cylindrical bodies includes a cylindrical main body and a plurality of projections projecting from the main body toward a center of the cylindrical body, the plurality of cylindrical bodies are stacked on one another in the cylindrical outer cylinder in an axial direction of the bubble generating device, and lengths of the tip ends of the plurality of projections are set to predetermined lengths such that the tip ends form an opening for generating cavitations at the central portion, and wherein the throat portion includes a lower end inlet opening formed as a conical tapered surface and an upper end outlet opening, and a portion between the inlet opening and the outlet opening is formed as a narrowed portion having a narrowed inner diameter and the injection port is placed such that the injection port opens vertically upward coaxially with a center axis of the narrowed portion in the vicinity of a boundary between the inlet opening and the narrowed portion, and wherein the narrowed inner diameter of the narrowed portion is larger than the inner diameter of the injection port so as for water existing outside of the nozzle to be sucked into the narrowed portion of the throat portion by the inflow action of the bubble flow into the narrowed portion, where the bubble flow accelerates the rising water flow energy or flow speed, and fluid in which water flow and bubble flow are mixed rises and flows into the above microbubble generating device located at a higher position.

2. The bubble generating device according to claim 1, wherein
a value of Fn/Ft between an opening area Fn of the injection port and an opening area Ft of the throat portion is set in a range of 0.1 to 0.4 or 0.1 to 0.5.

3. The bubble generating device according to claim 1, wherein
the plurality of cylindrical bodies are placed at a position where air injected from the injection port rises, and tip ends of the projections of the cylindrical body are formed into acute angles in a central portion on which the tip ends converge.

4. The bubble generating device according to claim 1, wherein
the microbubble generating device has liquid passing therethrough, the local speed of the liquid being 5 m or more per second by bubble flow injected from the injection port.

5. The bubble generating device according to claim 1, wherein a minimum diameter or a minimum passing width of the lower end inlet opening is 2 mm.

6. The bubble generating device according to claim 1, wherein the microbubble generating device is placed such that projections as viewed in the axial direction are not superposed on each other in the adjacent cylindrical bodies with each other.

7. A cylindrical body used in the bubble generating device according to claim 1, comprising a cylindrical main body and a plurality of projections projecting from the main body toward a center of the bubble generating device, wherein
the projections are formed into acute angles such that the projections form a substantially conical opening, and a diameter of the opening becomes smaller upward in an axial direction of the cylindrical main body.

* * * * *